Dec. 7, 1965
SAKAE OHISHI  3,221,535
MECHANISM FOR SELECTIVELY APPLYING LOADS OF DIFFERENT
MAGNITUDES IN HIGH TEMPERATURE MICRO-HARDNESS
TESTING APPARATUS
Filed Oct. 24, 1961
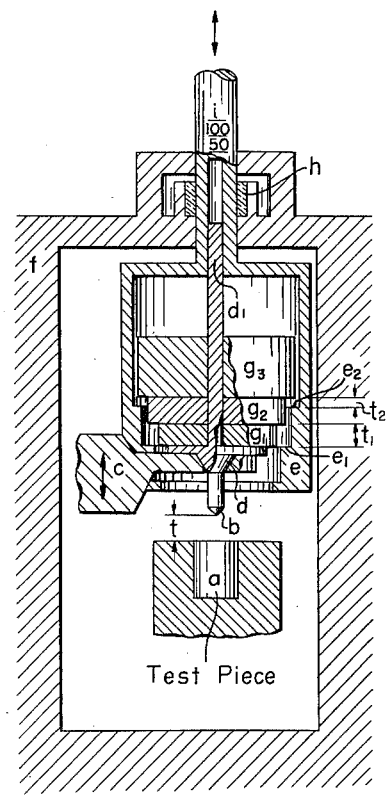
INVENTOR.
SAKAE OHISHI
BY
ATTORNEY

United States Patent Office 3,221,535
Patented Dec. 7, 1965

3,221,535
MECHANISM FOR SELECTIVELY APPLYING LOADS OF DIFFERENT MAGNITUDES IN HIGH TEMPERATURE MICRO-HARDNESS TESTING APPARATUS
Sakae Ohishi, Tokyo, Japan, assignor to Cohen Co., Ltd., Yokohama-shi, Japan, and Nippon Kogaku K.K., Tokyo, Japan, both corporations of Japan
Filed Oct. 24, 1961, Ser. No. 147,310
2 Claims. (Cl. 73—15.4)

Metallographical studies are being pursued energetically these days as metallurgical investigations record successes, and in view of the increased demand especially of jet engines, high-speed turbines, etc., such studies have become necessary to study the behavior of metals at high temperature in respect of their heat resistance, abrasion resistance, rupture, and other characteristics, in which studies the metals under test are subjected to the same conditions as they are in actual service. On the other hand, certain metals, on being heated in air undergo oxidation and other phenomena accompanied by the loss of their original physical structure for which they have importance, and it is necessary to carry out tests of metals at high temperature in vacuo.

The present invention relates to a mechanism for changing loads for high temperature microhardness testers for microscopically examining metals or other materials in air-tight vacuo at high temperature to measure their microhardness, instantly and continuously, under the conditions for which they are examined. With testing apparatus designed to have the internal air-tight evacuated region thereof isolated from the external air, like those to which the present inventive system is applicable, the exact transmission of external fine load to the internal region by operating a load fine-change mechanism positioned externally thereof is impossible, because of the influences from such factors as vacuum packing frictions, differential pressures, etc.; therefore, should it become necessary to apply a load in the evacuated region, especially more loads of varied weights, prior art apparatus usually included arrangements in which each assumedly necessary weight is placed on as load in a prescribed locality on every run of loading, just like those testers as are usually used as microsclerometers, or such arrangements where each necessary weight is taken out from a box, etc., to be loaded and unloaded on each run of loading in the system of transmitting load by lever or spring magnification, or arrangements in which leverage is utilized but where the attendant troubles that arise from mechanical errors at the fulcrum for the magnification of leverage and in the direction of loading must be taken into account. Such prior art operations as require dismounting of loads on every run of loading, should they be applied to high temperature vacuum microhardness testers with which the present inventive system is concerned, and the test be made continuously, would result in great losses of time and operation, as they require the reduction of the air-tight vacuum to the ambient pressure as also of the high temperature so much as nears the ambient one on every run of changing loads.

In contrast, the present invention gives means to change exactly, as well as continuously, the internal varied loads and let these act vertically to the surface to be measured, eliminating the taking in and out of loads, the use of leverage magnification and the spring means, but according the load of known weight within the internal air-tight evacuated region with the scale on the dial externally thereof without resultant loss of air-tight vacuum.

The drawing shows an illustrative embodiment according to the present invention.

In the drawing, $a$ designates a heated high temperature test material whose microhardness is to be measured and determined, $b$ an indenter end which, for example, is a diamond or a sapphire, fixed in place to stem $d$, which selectively carries on itself loads $g_1$, $g_2$, $g_3$, etc., each of known predetermined individual weight respectively, and the whole of the selected loads being carried by arm $c$, which is operated by oil pressure; $e$ designates a vertically movable frame for supporting the load weights not selected for making a particular test, the upper portion of the frame projecting upwardly and externally the evacuated region through air-tightening seal $h$, the extending portion having thereon a graduated scale of applied loads $i$. All the foregoing parts, except such scale bearing portion $i$ are within the evacuated region; $f$ designates the external housing of heat-resistant metal of the tester, $h$ being provided with a cooling means and also a means for vacuum isolation from the exterior ambient atmosphere; scale $i$ being provided with graduations from which the applied loads may be read. It will be noted that the interior of frame $e$ is provided with a plurality of annular steps, $e_2$, $e_1$, and $e$, each of successively smaller internal diameter and greater height downwardly, the treads of the steps being such that the loading weight of the largest diameter, $g_3$, may be supported on and held by the tread of upper step $e_2$, the loading weight of intermediate weight and diameter, $g_2$, on the tread of intermediate step $e_1$, and the loading weight $g_1$ of smallest weight and diameter on that of lowest step $e$. The loading weights are arranged in decreasing order downwardly according to weight and size, and obviously the plurality may be greater, or less, in number than the three shown in the drawing.

The operation of this mechanism is as follows:

$g_1$, $g_2$ and $g_3$ are, as stated, weights of known quantity, and so too are stem $d$ and indenter $b$, and $g_1$, $g_2$ and $g_3$ of known quantity are all acting on plate $d$. Assume that $b+d=25$ g., $g_1=25$ g., $g_2=50$ g., and $g_3=100$ g., and when a load of 50 g. is required, the distance $t_1$ through which the weight $g_1$ can drop before striking, and being stopped by, tread $e_1$ in its downward path, has been made greater than $t$, the distance between the lower end of indenter $b$ and the upper face of test specimen $a$ before the indenter is released by arm $c$, by vertically adjusting frame $e$ by setting the graduation of scale $i$ corresponding to the desired loading relative to a refernece mark, for example, at the level of the top face of enclosure $f$ above seal $h$. Arm $c$ which can carry all or a selected number of the load weights is slowly lowered to effect the loading $b+d+g_1$, $g_2$ and $g_3$, in other words, all the load weights descend by gravity in company with arm $c$ ($c$ actually descends by oil pressure, description thereof omitted) unless and until stopped by an annular step of the plurality $e_2$, $e_1$ and $e$. For example, having set the scale $i$ to indicate a load of 50, when the load weights have descended a distance of $t_1$, the bottom edge of weight $g_2$ hits the tread of step $e_1$ and only $g_2$ and $g_3$ remains topped on $e_1$ and $e_2$ respectively of the frame, so that the combination only if $b+d+g_1$; that is, a weight of 50 g., continues descending till indenter end $b$ acts upon the test material to be measured. But, even at the moment indenter end $b$ acts upon test piece $a$, arm $c$ continues descending, so as to remove itself completely from the applied load, with the result that the force at work at indenter end $b$ and on the impacted surface of the test element is the combination $b+d+g_1$ alone, or a weight of 50 g. And stem portion $d_1$, although going through frame $e$, is frictionless and its simply lying in frame $e$ perfectly prevents the weight system from being tilted. When $b+d+g_2$ or a weight of 100 g. is required, there must be arranged, as above stated by appropriate movement vertically of frame $e$, the relationship that $t_1$ is greater than $t$ which in turn is greater than $t_2$, the distance weight $g_3$ can move vertically downward before striking tread $e_2$, and external scale is lowered down to a certain definite position, then, arm $c$ is actuated to descend slowly; in a descent by a distance equal to $t_2$ of the arm, the bottom of $g_3$ hits step $e_2$, and weight $g_2$ and all the other lighter ones only continue descending so as to act upon test material $a$ to be measured. The graduation of scale $i$ corresponding to the loading just mentioned is marked as 100. In the same way of operation, change of a number of loads each of distinct weight, in the internal evacuated region, may be carried out as one wishes by setting scale $i$ in the external ambient air and thereby vertically adjusting the position of frame $e$.

The application of the present inventive system to high temperature microhardness testers provides means to change the internal loading weights within the air-tight evacuated region freely and exactly, simply by setting scale $i$ without the loss of vacuum and regardless of such external portions as bounding portion $h$ being tightly fitted with packing means between the external scale and the internal loading system or whose positive strength or weakness, or indeed such external elements as the air-tightness of the internal evacuated region, the erroneous variances in loads originating from differentials in air pressure relative to the ambient pressure, etc.

What I claim is:

1. An apparatus for micro-hardness testing of materials at elevated temperatures comprising a frame, a plurality of loading weights within the frame, the individual weights positioned one below the other of the plurality being of predetermined weight and each having a successively smaller diameter the lower it is positioned in the plurality and each having a central bore, an evacuated chamber within which the frame is vertically reciprocable, an air-tight seal at the top of the chamber, an extension integral with the upper end of the frame slidingly fitted in and passing through the air-tight seal to outside the chamber, means providing an internal vertical bore within the extension from its bottom to its closed upper region, a vertically slidable stem of which the upper region is within the bore of the extension and of which stem the intermediate region passes through the central bore of each loading weight, an annular plate integral with a lower portion of the stem, a radially inward tapering conical stem region integral with the lower face of the plate, an arm within the chamber extending into the frame, means providing a conical port through the arm, the conical stem region of the stem fitting into the conical port of the arm so that the arm normally supports the plate and the plurality of loading weights, an indenter below the conical stem region at the lower end of the stem, means adapted to support a specimen of the material to be tested at a predetermined region below and in the path of the indenter, a graduated scale on the portion of the extension external to the chamber, and means internally of the frame for loading the plate selectively with loading weights of the plurality and simultaneously adjusting the distance between the indenter and a specimen in the specimen holding means in accordance with the reading to which the scale is set by vertical manual positioning of the extension.

2. An apparatus for micro-hardness testing of materials according to claim 1 in which the means for loading the plate selectively comprises a series of annular shoulders concentric internally of the frame, the shoulders being successively larger upwardly in the frame and the distance between each two successive shoulders being greater than the thickness of the loading weight of the plurality engageable with the lower shoulder of each two successive shoulders.

References Cited by the Examiner

UNITED STATES PATENTS

| | | | |
|---|---|---|---|
| 2,938,377 | 5/1960 | Sklar | 73—83 |
| 2,986,922 | 6/1961 | Garofalo et al. | 73—15.4 |
| 3,026,709 | 3/1962 | Gautier et al. | 73—15.6 |

FOREIGN PATENTS

| | | |
|---|---|---|
| 757,578 | 9/1956 | Great Britain. |
| 78,608 | 7/1955 | Netherlands. |

RICHARD C. QUEISSER, *Primary Examiner.*

DAVID SCHONBERG, *Examiner.*